(12) United States Patent
Haikin

(10) Patent No.: US 7,103,217 B2
(45) Date of Patent: Sep. 5, 2006

(54) COLOR APPEARANCE SPACE TO CMYK MAPPING

(75) Inventor: John Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 10/841,184

(22) Filed: May 6, 2004

(65) Prior Publication Data
US 2005/0249408 A1 Nov. 10, 2005

(51) Int. Cl.
*G06K 9/00* (2006.01)
(52) U.S. Cl. .................................. 382/167
(58) Field of Classification Search ............. 382/167
See application file for complete search history.

(56) References Cited

U.S. PATENT DOCUMENTS

| | | | |
|---|---|---|---|
| 5,481,655 A | 1/1996 | Jacobs | 358/1.9 |
| 5,502,579 A * | 3/1996 | Kita et al. | 358/518 |
| 5,508,827 A * | 4/1996 | Po-Chieh | 358/518 |
| 5,553,199 A * | 9/1996 | Spaulding et al. | 358/1.9 |
| 5,710,824 A * | 1/1998 | Mongeon | 382/162 |
| 5,719,956 A | 2/1998 | Ogatsu et al. | 382/167 |
| 5,999,703 A * | 12/1999 | Schwartz et al. | 358/1.9 |
| 6,005,968 A | 12/1999 | Granger | 382/162 |
| 6,072,901 A * | 6/2000 | Balonon-Rosen et al. | 382/167 |
| 6,118,550 A | 9/2000 | Hayashi | 358/296 |
| 6,205,246 B1 * | 3/2001 | Usami | 382/167 |
| 6,281,984 B1 * | 8/2001 | Decker et al. | 358/1.9 |
| 6,335,800 B1 | 1/2002 | Balasubramanian | 358/1.9 |
| 6,341,175 B1 * | 1/2002 | Usami | 382/167 |
| 6,704,442 B1 | 3/2004 | Haikin et al. | 382/162 |
| 7,019,868 B1 | 3/2006 | Chang et al. | 358/2.1 |
| 2001/0033330 A1 * | 10/2001 | Garoutte | 348/153 |
| 2002/0159081 A1 | 10/2002 | Zeng | |
| 2003/0072015 A1 * | 4/2003 | Fujino | 358/1.9 |
| 2003/0072016 A1 | 4/2003 | Dalrymple et al. | 358/1.9 |
| 2005/0082542 A1 * | 4/2005 | Sumakeris et al. | 257/77 |
| 2005/0135672 A1 * | 6/2005 | Altenhof-Long et al. | 382/162 |

FOREIGN PATENT DOCUMENTS

JP 10136218 A * 5/1998

OTHER PUBLICATIONS

U.S. Appl. 10/740,395 (Altenhof-Long et al.), pending.

* cited by examiner

*Primary Examiner*—Wenpeng Chen
(74) *Attorney, Agent, or Firm*—Fitzpatrick, Cella, Harper & Scinto

(57) ABSTRACT

Color management which converts internal color appearance space color values to CMYK device values. CMY values are interpolated from a plurality of CMY to color appearance space lookup tables, wherein each CMY table is associated with a specific value of K. A target internal color value is received and one of the plurality of CMY lookup tables is selected based on a lightness value and neutrality of the target internal color value. A CMY value is interpolated from the selected lookup table and the target internal color value. The interpolated CMY value together with the associated K value from the selected table is provided as the converted CMYK color value. Advantageously, the conversion effects control over the output K value in a color appearance space to CMYK conversion. Accordingly, both neutral and non-neutral colors can be reproduced with better accuracy and higher quality.

11 Claims, 5 Drawing Sheets

COLOR APPEARANCE SPACE TO CMYK MAPPING

BACKGROUND OF THE INVENTION

1. Field of the Invention

The present invention relates to a color management method for the conversion of internal color appearance space to color values in CMYK device space.

2. Description of the Related Art

Typically, color management systems utilize color transforms to convert colors from device-dependent to device-independent color spaces, and vice versa. This is necessary because different devices display colors in different ways. For example, when one type of RGB monitor displays the color R=100, G=0, B=0, the measured output of that monitor may be different from the measured output of another type of RGB monitor that is displaying the same RGB value. Therefore, the two monitors cannot use the same RGB device values to display the same color. Accordingly, it is necessary to convert between device-dependent RGB values and a device-independent color appearance space so that colors can be accurately mapped and reproduced between different devices.

This mapping is typically achieved with color transforms. Conventionally, color transforms are created by measuring the output of a specific device at a plurality of known inputs. For example, a color transform for a CMYK printer can be computed by measuring color patches printed by the printer at a plurality of CMYK values. The measurements are taken by a color measuring device, such as a colorimeter or a spectrophotometer, and the measurements are in a device-independent color space, such as CIEXYZ, CIELab, CIECAM, or CIELuv. With these measurements, a color management system is able to easily predict what device-independent color a printer will produce at a specific value of CMYK.

However, color management systems ordinarily rely on a conversion in the reverse direction, from device-independent color values to CMYK device-dependent values, and this conversion is not as straightforward. As with other color spaces having four or more color components, the CMYK space is overspecified. In other words, the same color can be produced using different amounts of black ink (K) with varying amounts of cyan, magenta, and yellow (CMY). Therefore, a one to one conversion from color appearance space to CMYK space is not possible. This leads to potentially unsatisfactory conversions, since certain levels of black ink may produce visually unsatisfactory colors. For instance, neutral colors, such as grays, typically look better with higher amounts of black ink. On the other hand, saturated non-neutral colors appear sharper with low amounts of black ink.

Attempts have been made to control the K level in CMYK to CMYK device conversions. However, these attempts have failed to address the problems associated with controlling the K level in a color appearance space to CMYK space conversion. Other attempts have been made to treat the conversion of neutral and non-neutral color appearance space values differently, but have generally been unsatisfactory.

As such, conventional methods for converting color appearance space values to CMYK values have failed to provide for adequate control over the K channel. Accordingly, these methods may produce unsatisfactory color reproduction for highly neutral or highly non-neutral or, saturated colors.

SUMMARY OF THE INVENTION

The present invention addresses the foregoing problems by selecting a K value based on the lightness and neutrality of a target color value, and thereafter obtains CMY values based on the selected K value and the target value.

According to one aspect of the invention, a target internal color value is received and one of a plurality of CMY lookup tables is selected based on a lightness value and neutrality of the target internal color value. Each CMY lookup table maps from CMY space to internal color space for a fixed value of K, and the selected table contains the target color. Next a CMY value is interpolated from the selected lookup table and the target internal color value. Finally, the interpolated CMY value and the associated K value from the selected table is provided as the converted CMYK color value.

According to more preferred aspects of the invention, the CMY table is selected by first, determining the neutrality of the target internal color value, and then selecting the CMY lookup table associated with the largest value of K which contains the target internal color value in the case that the target internal color value is determined to be neutral, and selecting the CMY lookup table associated with the smallest value of K which contains the target internal color value in the case that the target internal color value is determined to be non-neutral.

By interpolating CMY values from one of a plurality of CMY lookup tables keyed to a specific value of K, and selecting the CMY lookup table based on the lightness and neutrality of the target internal color value, the present invention is able to control the output K value in a color appearance space to CMYK conversion. In this way, both neutral and non-neutral colors can be reproduced with better accuracy and higher quality.

According to another aspect of the invention, the step of interpolating the CMY value is further accomplished by computing an error in the color appearance space value corresponding to the interpolated CMY value. The computed error is then compared to a predetermined error threshold. The interpolated CMY value is provided, in the case that the predetermined threshold is met. In the case that the predetermined error threshold is not met, a new CMY lookup table is selected, and a new CMY value is interpolated from the newly selected lookup table and the target internal color value.

According to yet another aspect of the invention, the interpolation is achieved using Newton's method and Jacobians.

According to still another aspect of the invention, the plurality of CMY lookup tables is created by obtaining measurement data in a color appearance space format for a plurality of CMYK values for a CMYK device, and populating a plurality of three-dimensional CMY to color appearance space lookup tables, wherein each table contains color appearance space measurement values that correspond to a specific value of K.

According to another aspect of the invention, the measurement data is obtained by measuring the output of the CMYK device with a color measuring device.

According to yet another aspect of the invention, the measurement data is obtained by converting a plurality of CMYK color samples into color appearance space values with a preexisting color transform associated with the CMYK device.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
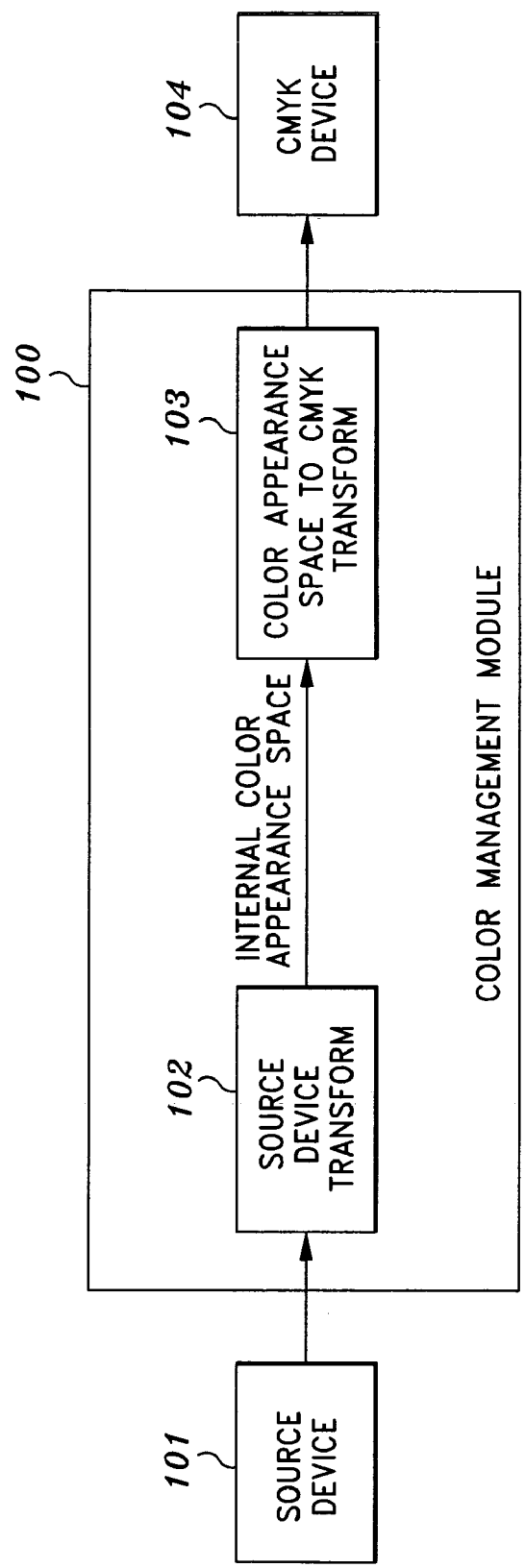
FIG. 1 is a block diagram depicting the operation of a color management system.

The present invention provides a color management method for converting color appearance space values to CMYK values, wherein control is maintained over the K channel.

Typically, the present invention is implemented in a computing environment. A representative computing system may include computing equipment, peripherals and digital devices which may be used in connection with practicing the present invention. The computing equipment includes a host processor which comprises a personal computer (hereinafter "PC"), preferably an IBM PC-compatible computer having a windowing environment such as Microsoft Windows 98, Windows 2000, Windows Me, Windows XP, or Windows NT, or other windowing systems such as LINUX. In the alternative, the host processor may be an Apple computer or other non-windows based computers. The computing equipment also includes a color monitor, including a display screen, a keyboard for entering text data and user commands, and a pointing device. The pointing device preferably comprises a mouse for pointing and for manipulating objects displayed on the display screen.

The computing equipment also includes computer-readable memory media such as a computer fixed disk and a floppy disk drive. A floppy disk drive provides a means whereby the computing equipment can access information, such as image data, computer-executable process steps, application programs, etc. stored on removable memory media. In the alternative, information can also be retrieved through other means such as a USB storage device connected to a USB port, or through a network interface. Also, a CD-ROM drive and/or a DVD drive may be included so that the computing equipment can access information stored on removable CD-ROM and DVD media.

Various peripheral devices are generally used in the computing system. For example, color bubble jet printers and color laser printers, which form color images on a recording medium such as paper or transparencies or the like are typically employed. Preferably, the printers form color images using cyan, magenta, yellow and black inks.

The internal architecture of the host processor of the computing equipment includes a central processing unit (CPU) which interfaces with a computer bus. Also interfacing with computer bus are a fixed disk, a network interface, a random access memory (RAM) for use as a main run-time transient memory, a read only memory (ROM), a floppy disk interface, a display interface for the monitor, a keyboard interface for the keyboard, a mouse interface for the pointing device, a scanner interface for the scanner, a printer interface for the printers, and a digital camera interface for the digital camera.

The RAM interfaces with the computer bus so as to provide information stored in the RAM to the CPU during execution of software programs such as an operating system, application programs, such as a color management module, and device drivers. More specifically, the CPU first loads computer-executable process steps from the fixed disk, or another storage device, into a region of the RAM. The CPU can then execute the stored process steps from the RAM in order to execute the loaded computer-executable process steps. Data such as color images, color measurements, color transforms, or other information can be stored in the RAM, so that the data can be accessed by CPU during the execution of computer-executable process steps need to access and/or modify the data.

The fixed disk contains the operating system, and application programs, such as a color management system program. The fixed disk also contains a digital camera driver, a monitor driver, a printer driver, a scanner driver, and other device drivers. The fixed disk also includes image files, other files, transform-based device profiles for implementing the present invention as described further herein, and color management modules.

The color management method of the present invention is preferably performed by computer-executable process steps which are stored on the fixed disk execution by the CPU, such as in one of the application programs, a printer driver, or in an operating system. In addition, the present invention could also be performed by software or hardware contained within a printer. The process steps for converting color appearance space values to CMYK values, with control on the K channel, of the present invention are described in more detail below.

FIG. 1 depicts a conventional color management system in which the destination device is a CMYK device. Color management module (CMM) 100 utilizes source device transform 102 to convert device-dependent color values output by source device 101 into an internal color appearance space. The color appearance space can be implemented in many different formats, including CIELab, CIECAM, and CIELuv. CMM 100 also typically performs color processing operations, such as gamut mapping, on the color data in the color appearance space. CMM 100 uses color appearance space to CMYK transform 103 to convert color appearance space values into CMYK values that can be used by CMYK device 104.

The present invention presents a method for a color appearance space to CMYK conversion that maintains control over the K (black ink) channel. Maintaining control over the K channel in this conversion is beneficial because neutral colors, such as grays, typically look better with higher amounts of black ink, and saturated non-neutral colors appear sharper with low amounts of black ink. Since the CMYK color space is overspecified, i.e. different amounts of black ink (K) can be used with varying amounts of cyan, magenta, and yellow (CMY) to produce the same color, more than one definition exists when converting from color appearance space to CMYK space. Simply put, a 4 to 3 CMYK to color appearance space transform cannot be inverted to produce the reverse transform.

Figure 2:
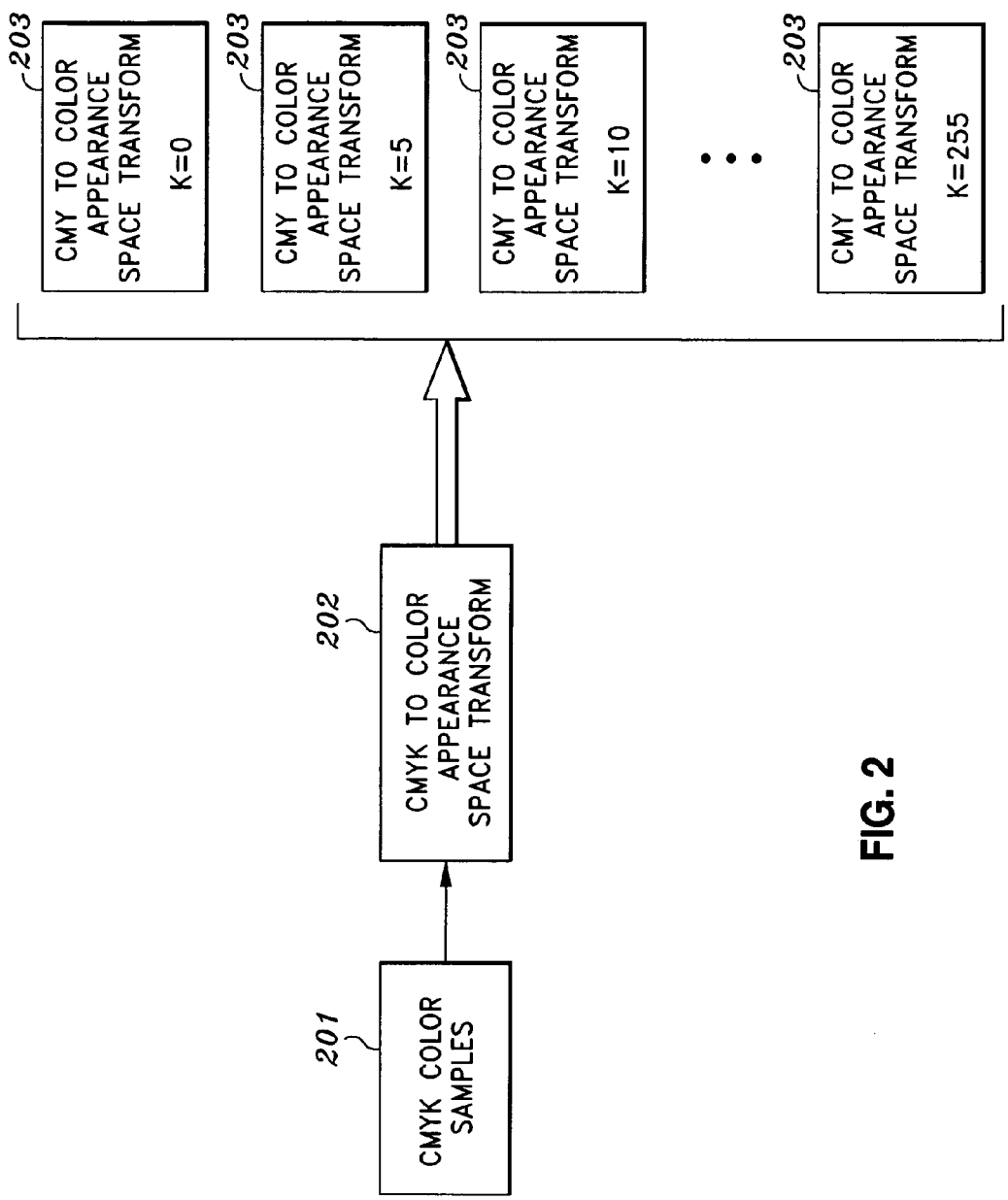
FIG. 2 is a block diagram depicting the creation of K-based lookup tables.

As such, the first step of the invention is the creation of a plurality of 3×3 CMY to color appearance space lookup tables (LUT). Each table is a 3×3 LUT is keyed to a constant value of K. FIG. 2 depicts one method by which these tables can be created. CMYK color samples 201 are supplied to CMYK to color appearance space transform 202. Transform 202 is the forward (i.e., CMYK to color appearance space) transform associated with the device for which the color appearance space to CMYK conversion is desired. In effect, running CMYK color samples through transform 202 creates 'psuedo color measurements' for the associated CMYK device.

These measurements are then put into the LUT 203 corresponding to the K value of the sample. With the K value constant, each entry in one of LUTs 203 maps a color defined by its CMY color components to a color in color appearance space. In the preferred embodiment, 51 LUTs are created, where the K value of the LUTs range in decimal values of K=0 to K=255 in steps of 5. More or fewer tables could be used, depending on the desired degree of control over the K channel. Along with the associated K value, each LUT 203 also stores the smallest and largest lightness value of the color appearance space values contained therein. For instance, for a CIECAM (Jab) color appearance space, the smallest and largest J value is stored. For a CIELab color appearance space, the smallest and largest L values would be stored.

The method for creating the 51 CMY to color appearance space LUTs depicted by FIG. 2 may be unnecessary if actual color measurements for the desired CMYK device are available. Such measurements could simply be grouped into different LUTs based on K value. Again, the smallest and largest lightness value contained in each LUT would also be stored.

Once created, LUTs 203 can be stored on a fixed disk for future use. Alternatively, LUTs 203 can be recreated each time they are needed in order to conserve disk space. Of course, there are many acceptable ways of arranging and accessing LUTs 203 in a storage medium.

Figure 3:
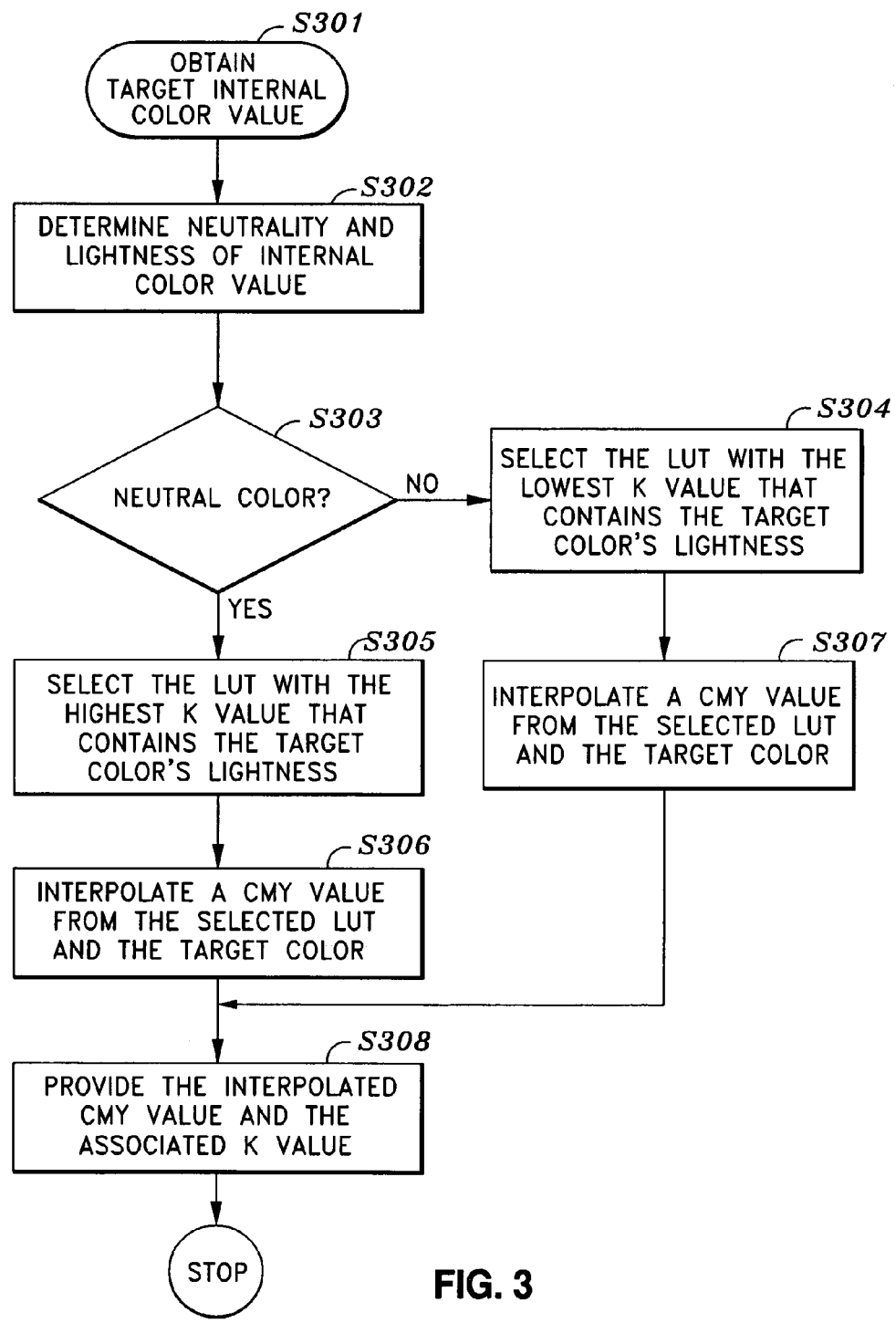
FIG. 3 is a flowchart depicting a process for the conversion of color appearance space values to CMYK.

The CMY to color appearance space LUTs 203 can be inverted to generate the desired conversion. FIG. 3 shows a flowchart depicting this process. Initially, in step S301 a target color appearance space value (target color value) is obtained. This target color value represents a color appearance space value that is to be converted to CMYK. For instance, the target color value could represent one pixel of an image file.

Next, in step S302, the neutrality and lightness of the target color value are determined. For Jab, Lab, and Luv color appearance spaces, the lightness is simply the J or L value. The neutrality of the target color value is defined with reference to a predetermined distance from the neutral axis. For instance, in a Jab color appearance space, J is the neutral axis where a=b=0. A neutral color can be defined as a color value where the absolute value of both the a and b channels is less than some predetermined amount. In the preferred embodiment, a neutral color is defined as any internal color value for which |a| <3 and |b|<3, where the a and b channels range from −100 to 100. If the absolute value of either the a or b channel is greater than three, the color is determined to be non-neutral.

In step S303, it is decided if the target color value is neutral or not. If the target color value is neutral, the one of the 51 LUTs with the highest K value that may contain the target color is selected in step S305. Likewise, in step S303, if the target color value is non-neutral, the one of the 51 LUTs with the lowest K value that may contain the target color is selected in step S304. In steps S304 and S305, the target color value can be determined to possibly be contained in the LUT if the lightness of the target color value falls within the lightness range stored with the LUT.

Next, whether the target color value is neutral or non-neutral, a CMY value is interpolated from the selected table, based on the target color value, in steps S306 and S307 respectively. The interpolation process will be discussed in more detail below.

Figure 4:
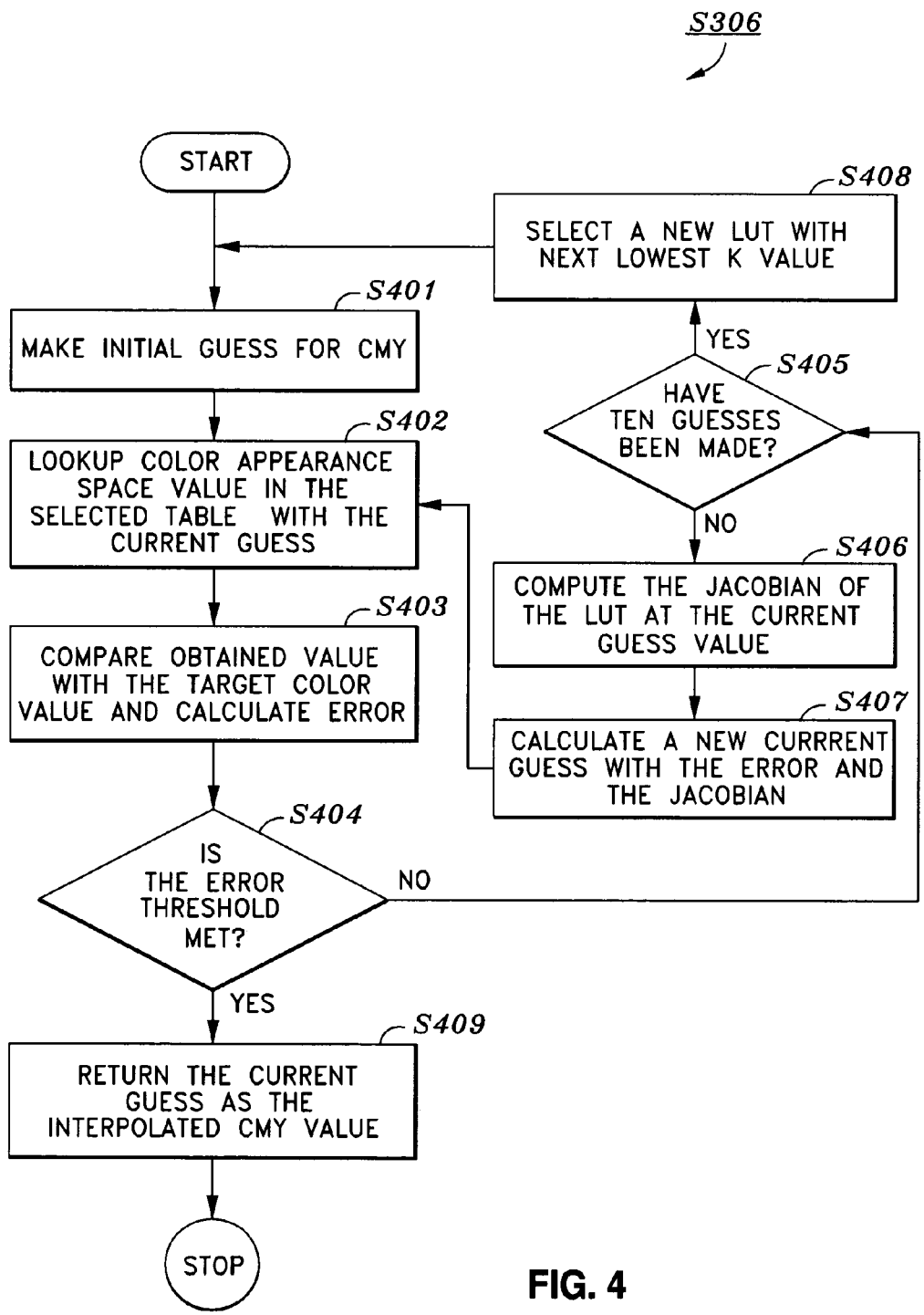
FIG. 4 is a flowchart depicting a process for interpolating CMY values for neutral colors.

FIG. 4 depicts the process by which step S306 interpolates a CMY value from the selected table, based on a neutral target color value. The interpolation process used in the preferred embodiment is Newton's method. First, an initial guess for CMY is made in step S401. Preferably, the initial guess for CMY is (0.3, 0.3, 0.3) where C, M, and Y range from 0.0 to 1.0. This corresponds to CMY percentages of 30% for each channel.

In step S402, the CMY guess (gC, gM,gY) is applied to the selected LUT and a color appearance space value is obtained. In the case that the color appearance space, and therefore the target color value, is in a Lab format, the LUT would be a CMY to Lab LUT. Similarly, if the color appearance space is in a Jab format, the LUT would be a CMY to Jab LUT. For a Lab color appearance space, the CMY guess will return a Lab guess value (gL, ga, gb). The obtained Lab guess value is then compared to the target color value (tL, ta, tb). In step S403, the error is calculated and stored. The error is defined as the Euclidean distance between the Lab guess and the target color value In step S404, the calculated error is compared to a predetermined error threshold. In a preferred embodiment, the error threshold is set at 0.001. If the calculated error is less than the predetermined error threshold, the interpolation is considered to be accurate, and step S404 proceeds to step S409. It should be noted that, for this calculation, it is sufficient to use the square of the error and the square of the threshold. This eliminates the need to compute a square root, thereby improving speed without sacrificing accuracy. In step S409, the current guess for CMY is supplied to step S308 in FIG. 3, as the interpolated CMY value.

If the calculated error is more than the predetermined error threshold, step S404 proceeds to step S405. In step S405, it is determined if ten guesses have already been made. Note that 10 guesses is a preferred number for the iteration. Larger or smaller values can be used, provided that convergence is achieved. If ten guess have not yet been made, step S405 proceeds to steps S406 and S407. In these steps, the Jacobian (j), or three-dimensional derivative, of the LUT is calculated at the point of the current CMY guess. The calculated Jacobian and error are then used to calculate a new guess.

The new guess is calculated by first computing a Newtonian step delta (d) according to the following equation:

$$(d) = (tL-gL, ta-ga, tb-gb)$$

A Newtonian step is then calculated by solving the following equation for x, where j is the calculated Jacobian.

$$j \cdot x = (d)$$

The new guess for CMY is then computed by adding x to the previous guess. The process then returns to step S402, and the new guess for CMY is applied to the LUT.

If, on the other hand, ten guesses (i.e. iterations) have already been made without meeting the predetermined error threshold, step S405 proceeds to step S408. At this point it is determined that, even though the target color value could have possibly been contained in the selected LUT, a CMY value could not be found that maps to the target color value with the desired accuracy. As such, step S408 selects the LUT with the next lower K value, as compared to the previously selected LUT. For instance, if in step S305 the K=225 LUT was selected, step S408 would now select the K=220 LUT. The process then returns to step S401 in order to perform an interpolation on the newly selected LUT.

This process continues until the error threshold is met and the interpolated CMY value is provided in step S409. It is possible that all possible LUTs will be tried and that the error threshold will not be met. If this is the case, the CMY guess that returned the smallest error, along with the K associated with the table, is used as the interpolated value.

Figure 5:
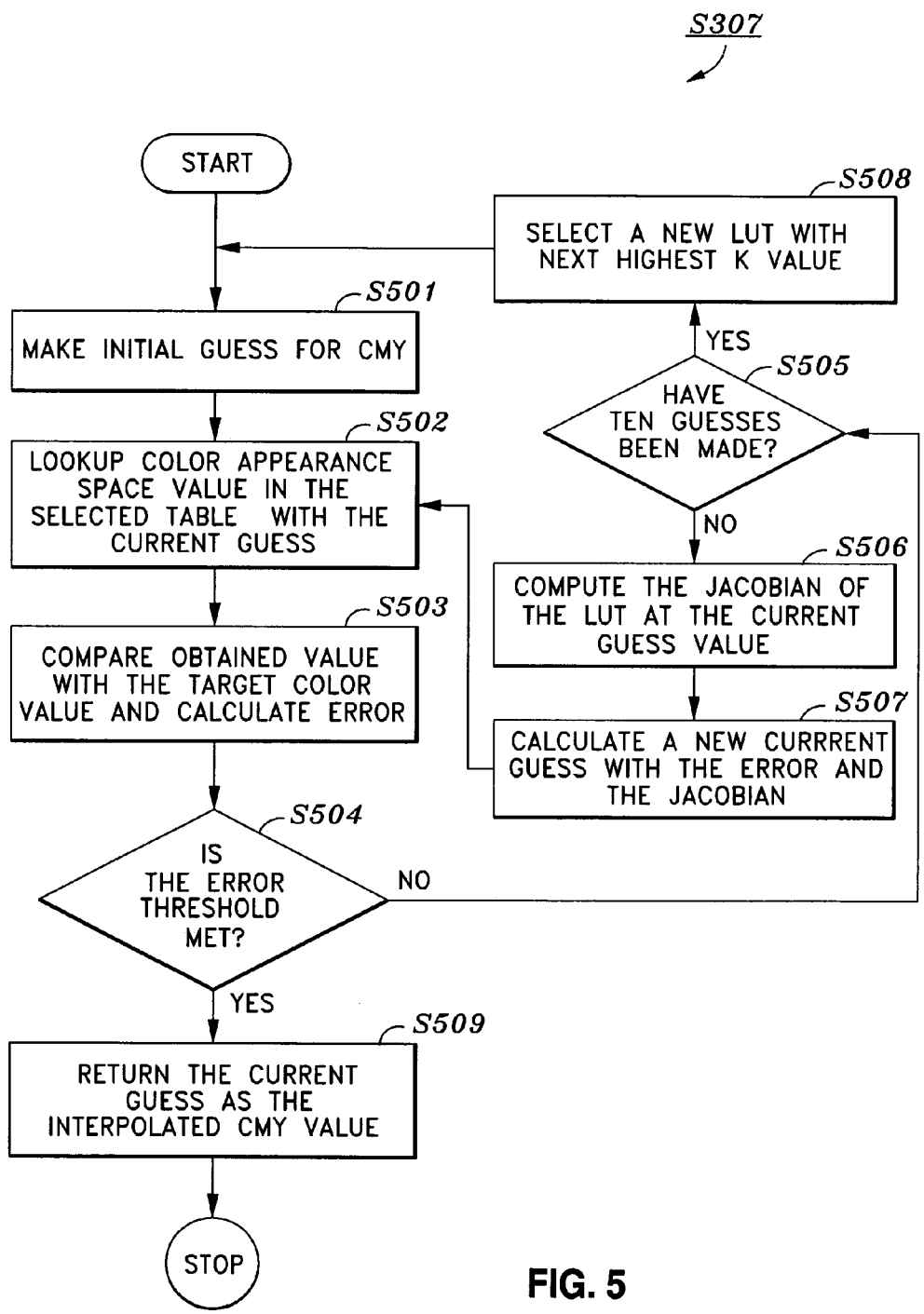
FIG. 5 is a flowchart depicting a process for interpolating CMY values for non-neutral colors.

FIG. 5 depicts the process for interpolating CMY values for non-neutral colors in step S307. This process is the same as that depicted in FIG. 4, except that in step S508, the LUT with the next higher K value is selected, as compared to the previously selected LUT. For instance, if in step S304 K=15 LUT was selected, step S508 would now select the K=20 LUT.

Finally, returning to FIG. 3, the interpolated CMY value, together with the associated K from the table from which the CMY value was interpolated, are provided as the converted CMYK value in step S308. The entire process is repeated for each target color value that is to be converted to CMYK.

The process of converting color appearance space values to CMYK values with control on the K channel that is described above can be used in a color management system. For instance, the process described above could be used in place of transform 103 shown in FIG. 1. In addition, the present invention can be used to convert color appearance space values to CMYK values as process steps in a printer driver, or in the printer itself.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A color management method for converting internal color values to CMYK color values, wherein the method utilizes a color transform that converts CMYK color values to internal color values, the color transform being arranged as a plurality of three-dimensional CMY space to internal color space lookup tables, each associated to a different K value, the method comprising the steps of:
   receiving a target internal color value;
   selecting one of the plurality of CMY lookup tables that contains the target internal color value based on a lightness value and neutrality of the target internal color value, wherein said selecting step comprises determining the neutrality of the target internal color value; selecting the CMY lookup table associated with the largest value of K which contains the target internal color value in the case that the target internal color value is determined to be neutral; and selecting the CMY lookup table associated with the smallest value of K which contains the target internal color value in the case that the target internal color value is determined to be non-neutral;
   interpolating a CMY value from the selected lookup table and the target internal color value, wherein said interpolating step comprises computing an error in the interpolated CMY value; comparing the computed error to a predetermined error threshold; providing the interpolated CMY value, in the case that the predetermined threshold is met; and selecting a new CMY lookup table, in the case that the predetermined error threshold is not met, and interpolating a new CMY value from the newly selected lookup table and the target internal color value; and
   providing the interpolated CMY value and the associated K value from the selected table as the converted CMYK color value.

2. The method according to claim 1, wherein the interpolation is achieved using Newton's method and Jacobians.

3. The method according to claim 2, wherein the target internal color value is in a CIELab format.

4. The method according to claim 2, wherein the target internal color value is in a CIECAM format.

5. The method according to claim 2, wherein the target internal color value is in a CIELuv format.

6. The method according to claim 1, wherein the plurality of CMY space to internal color space lookup tables is created with the following steps:
   obtaining measurement data in an internal color space format for a plurality of CMYK values for a CMYK device;
   populating the plurality of three-dimensional CMY to internal color space lookup tables, wherein each table contains internal color space measurement values that correspond to CMY values at a specific value of K.

7. The method according to claim 6, wherein the measurement data is obtained by measuring the output of the CMYK device with a color measuring device.

8. The method according to claim 6, wherein the measurement data is obtained by converting a plurality of CMYK color samples into internal color space values with a preexisting color transform associated with the CMYK device.

9. The method according to claim 6, wherein 51 CMY to color appearance space lookup tables are created, the 51 tables corresponding to K values from digital values of 0 to 255 in steps of 5.

10. An apparatus for converting internal color values to CMYK color values, wherein the apparatus utilizes a color transform that converts CMYK color values to internal color values, the color transform being arranged as a plurality of three-dimensional CMY lookup tables, each associated to a different K value, the apparatus comprising:
   a program memory for storing process steps executable to perform a method according to any of claim 1 to 9; and
   a processor for executing the process steps stored in said program memory.

11. A computer-readable medium which stores computer-executable process steps, the computer-executable process steps for converting internal color values to CMYK color values, wherein the computer-executable process steps utilize a color transform that converts CMYK color values to internal color values, the color transform being arranged as a plurality of three-dimensional CMY lookup tables, each associated to a different K value, said computer-executable process steps comprising process steps executable to perform a method according to any of claims 1 to 9.

* * * * *